(12) United States Patent
Takei et al.

(10) Patent No.: US 6,867,910 B2
(45) Date of Patent: Mar. 15, 2005

(54) WIDEBAND ASE LIGHT SOURCE

(75) Inventors: Yusuke Takei, Yokohama (JP); Hiromi Ajima, Yokohama (JP); Yukiko Furukata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/132,081

(22) Filed: Apr. 23, 2002

(65) Prior Publication Data

US 2002/0191415 A1 Dec. 19, 2002

(30) Foreign Application Priority Data

Apr. 24, 2001 (JP) ..................................... P2001-126388
Apr. 26, 2001 (JP) ..................................... P2001-130426

(51) Int. Cl.[7] .................................................. H01S 3/00
(52) U.S. Cl. .................................................. 359/341.1
(58) Field of Search .......................... 359/341.1, 341.5, 359/347

(56) References Cited

U.S. PATENT DOCUMENTS

| | | | | |
|---|---|---|---|---|
| 4,938,556 | A | * 7/1990 | Digonnet et al. | 359/341.31 |
| 5,361,161 | A | * 11/1994 | Baney et al. | 359/337 |
| 5,875,203 | A | * 2/1999 | Wagener et al. | 372/6 |
| 5,894,488 | A | * 4/1999 | Gaiffe et al. | 372/6 |
| 6,195,200 | B1 | * 2/2001 | DeMarco et al. | 359/337.21 |
| 6,404,539 | B1 | * 6/2002 | Kotrotsios et al. | 359/341.1 |
| 6,429,965 | B1 | * 8/2002 | Falquier et al. | 359/341.1 |
| 6,483,628 | B1 | * 11/2002 | Digonnet et al. | 359/333 |
| 6,501,592 | B2 | * 12/2002 | Terahara | 359/345 |
| 6,507,429 | B1 | * 1/2003 | Ales et al. | 359/341.1 |
| 2001/0046364 | A1 | * 11/2001 | Ajima et al. | 385/142 |
| 2003/0156318 | A1 | * 8/2003 | Anderson et al. | 359/341.5 |

FOREIGN PATENT DOCUMENTS

| | | | | |
|---|---|---|---|---|
| EP | 1024541 A2 | * | 8/2000 | ............ H01L/49/00 |
| JP | 3-028830 | | 2/1991 | ............ G02F/1/35 |
| JP | 09237930 A | * | 9/1997 | ............ H01S/3/10 |
| JP | 2001127363 A | * | 5/2001 | ............ H01S/3/10 |
| JP | 2001135880 A | * | 5/2001 | ............ H01S/3/10 |

OTHER PUBLICATIONS

Hall et al. High–Stability Er3+— Doped Superfluorescent Fiber Sources. Journal of Lightwave Technology. vol. 13, No. 7, Jul. 1995. pp. 1452–1460.*

*Japanese Laid–Open Publication No. 3–028830 corresponding U.S. Appl. No. 4,938,556.

* cited by examiner

Primary Examiner—Thomas H. Tarcza
Assistant Examiner—Deandra M. Hughes
(74) Attorney, Agent, or Firm—Hogan & Hartson LLP

(57) ABSTRACT

Provided is a wideband ASE light source, which has a high output and a little ripples in a wide band and the output of which is stable. In a wideband ASE light source constructed of a pumping light source that generates a pumping light, an erbium-doped optical fiber that generates an ASE light by incident pumping light, a reflector that is arranged at one terminal portion of the erbium-doped optical fiber and reflects the ASE light radiated from the erbium-doped optical fiber, an optical multiplexer that is arranged between a terminal portion of the erbium-doped optical fiber and the pumping light and optically multiplexes and demultiplexes the pumping light with or from the ASE light and an optical isolator that is arranged between the third terminal portion of the optical multiplexer and an output terminal and removes a return light to the erbium-doped optical fiber, the optical multiplexer has a maximum value of isolation in a wavelength band of 1570 nm to 1600 nm.

9 Claims, 7 Drawing Sheets

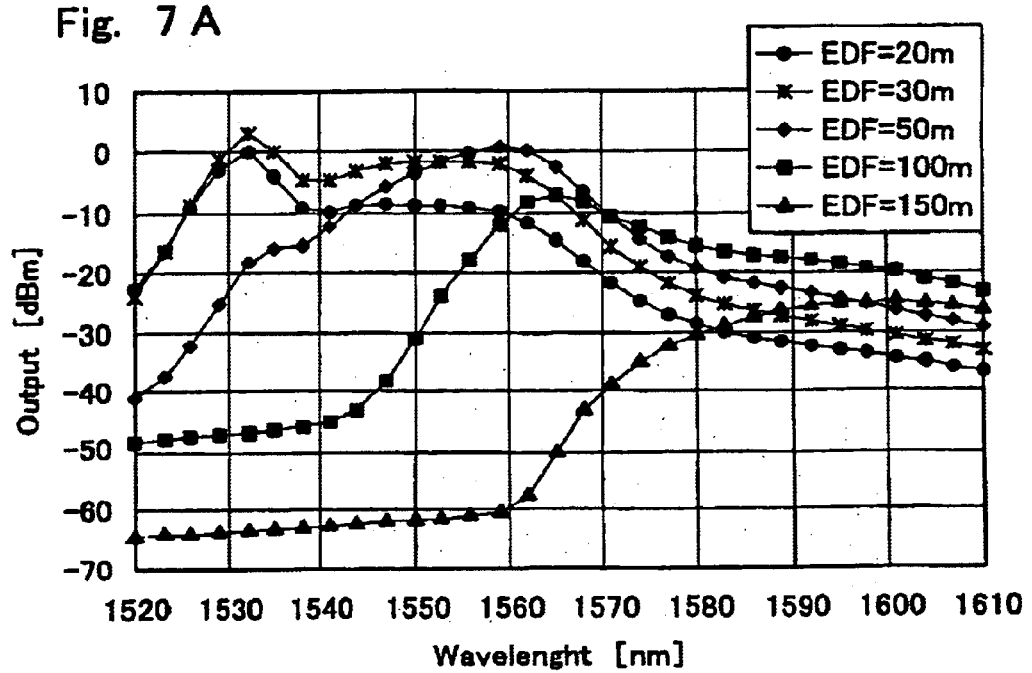
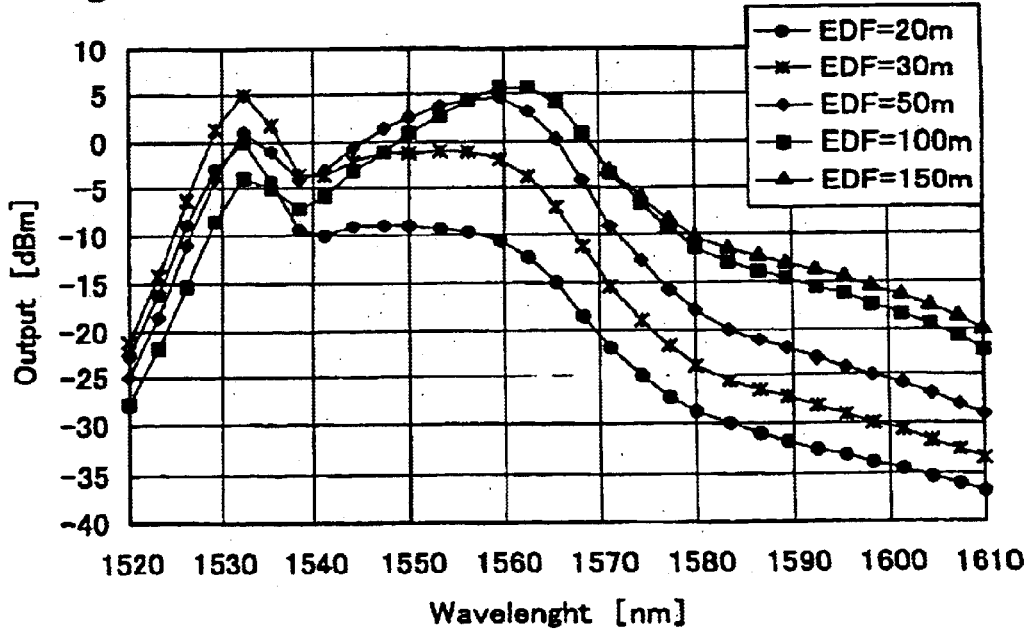

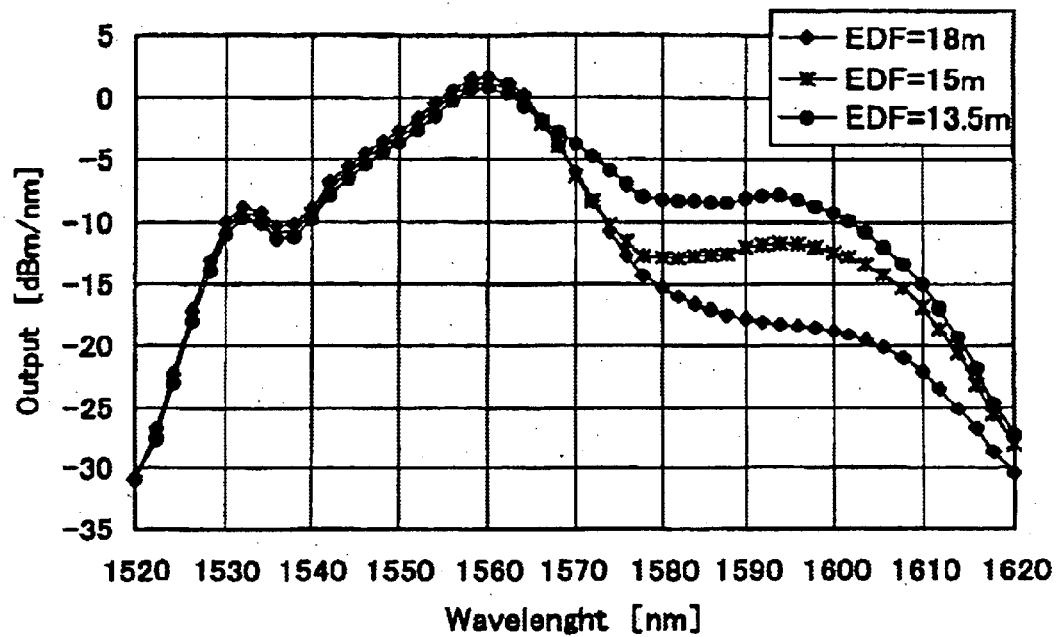
Fig. 8A ASE Spectrum Pumping Light Intensity [10mW]
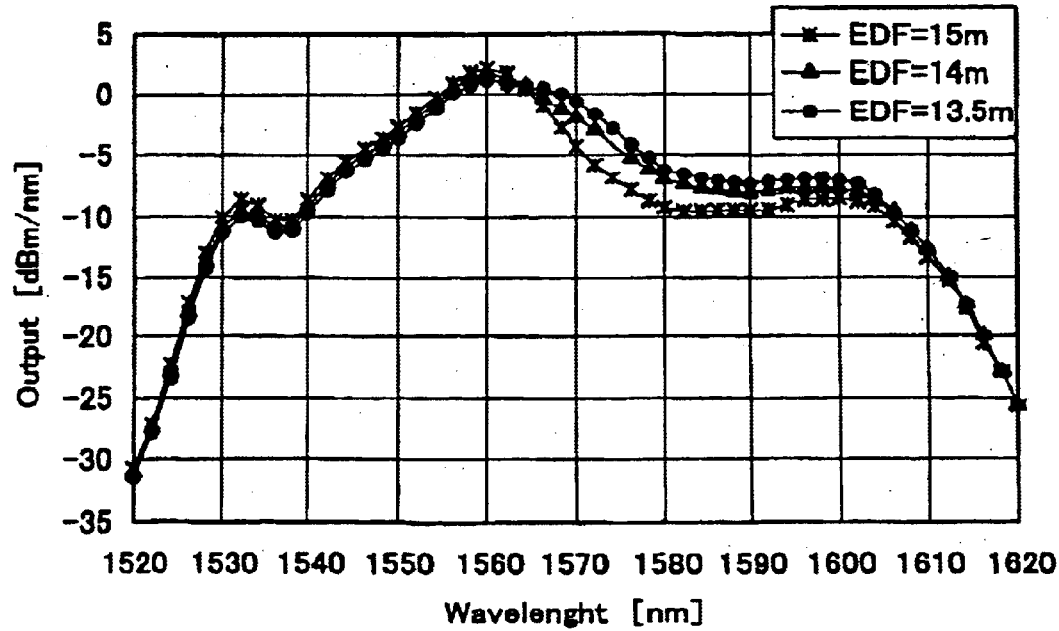
Fig. 8B ASE Spectrum Pumping Light Intensity [130mW]

WIDEBAND ASE LIGHT SOURCE

BACKGROUND OF THE INVENTION

1. Field of the Invention

The present invention relates to a wideband spontaneous emission light source that employs a light source of spontaneous emission light generated from a rare earth-doped optical fiber and is suitable for use as a light source in a wavelength multiplex optical communication system, optical measurement and so on.

2. Prior Art

A rare earth-doped optical fiber has an amplification characteristic capable of yielding a high gain at a certain wavelength with incident pumping light within a certain range of wavelength. Therefore, if a signal light in a wavelength band in which the rare earth-doped optical fiber has a certain amplification gain is transmitted through the fiber, then the light intensity of the signal light is remarkably increased. This characteristic is currently widely utilized as an optical amplifier in the field of optical communications.

Upon receiving an incident pumping light, the rare earth-doped optical fiber yields a gain of the signal light and also generates a spontaneous emission light. The generated spontaneous emission light is amplified by the gain, and the optical output is increased. The light generated as described above is referred to as Amplified Spontaneous Emission light, which will hereinafter be abbreviated to ASE light.

The rare earth-doped optical fiber is able to produce a large output of ASE light emission by virtue of the high gain possessed by itself and to be used as a wideband light source. In recent years, according to the demand for increasing the communication capacity, there has been examined a wavelength-multiplex optical communication system, which transmits and receives optical signals that have different wavelengths through multiplexing by using a wide wavelength band. On the above-mentioned background, a wideband light source that uses the ASE light of the rare earth-doped optical fiber is used as an incoherent light source for WDM and as an experimental light source for WDM system optical components.

By utilizing an erbium-doped fiber for the rare earth-doped optical fiber, a 1570–1610-nm band (1580-nm band) is applied to communications in addition to the 1530-to-1560-nm band (1550-nm band) applied conventionally, with which the wavelength band utilized for optical communications is being expanded. Accordingly, it is required for a component for optical communications in a wide wavelength band to operate in the wavelength band of 1530 to 1610 nm or higher band. In order to measure the loss wavelength characteristic of the component, there is demanded a high-output wideband light source to cover this wavelength band and expand the measurement dynamic range.

An example of the conventional wideband ASE light source is disclosed in Japanese Patent Laid-Open Publication No. 3-028830. As shown in FIG. 10, this light source is constructed of a pumping light source 101 for generating a pumping light of a prescribed wavelength, a rare earth-doped optical fiber 102 for generating an ASE light by the incident pumping light, a reflector 103 for reflecting the ASE light radiated from the rare earth-doped optical fiber and a multiplexer for uniting the rare earth-doped optical fiber 102, the pumping light source 101, an optical multiplexer 104 and an output terminal 105 with one another.

In this ASE light source, a pumping light Lp emitted from the light source 101 is transmitted through the optical multiplexer 104 and made incident on the rare earth-doped optical fiber 102. The rare earth-doped optical fiber is excited by the incident pumping light Lp and generates a forward light Lf in the forward direction and a backward light Lb in the backward direction as an ASE light. The forward light Lf is reflected on the reflector 103, made incident again on the rare earth-doped optical fiber 102 and made to pass together with the backward light Lb of the ASE light while being optically multiplexed in the optical multiplexer 104.

This optical multiplexer 104 has a function to optically combine lights of the wavelengths of the backward light Lb and the forward light Lf of the ASE light and to interrupt the light having the wavelength of the pumping light Lp. In this meaning, such a multiplexer should be a wavelength division multiplexer/demultiplexer, but is simply referred to as a multiplexer in this specification.

The ASE light of backward light Lb and forward light Lf, which has passed through the optical multiplexer 104, goes out of the output terminal 105.

As described above, by making the ASE light of forward light Lf reciprocally pass through the rare earth-doped optical fiber by reflecting the forward light Lf on the reflector 103, light of a higher intensity can be outputted. A fiber doped with erbium Er is able to emit light in a short wavelength hand of 1530 to 1570 nm as the backward light Lb of the ASE light and emit light in a longer wavelength band of not shorter than 1570 nm as the forward light Lf. Therefore, the light source of the Er-doped optical fiber can achieve a wideband light source by concurrently outputting the forward light Lf in the forward direction and the backward light Lb in the backward direction.

Moreover, although not shown in the aforementioned Japanese Patent Laid-Open Publication No. 3-028830, an optical isolator of a type that does not depend on a polarized wave is generally arranged in the stage before the output terminal 105. This optical isolator plays the role of removing a reflected return light to the rare earth-doped optical fiber 102 and produces the effect of suppressing parasitic oscillation which would be caused by the reflected return light and a reduction in the gain which would be caused by the multi-path reflection of the ASE light.

However, the conventional wideband ASE light source shown in FIG. 10 of the aforementioned Japanese Patent Laid-Open Publication No. 3-028830, which has a double-path structure of reflection, is therefore very sensitive to the reflected return light from the isolator. There has been the problem that ASE light ripples occur to cause an unstable output when the output of the pumping light source 101 is increased even with the optical isolator arranged and parasitic oscillation occur at a specific wavelength when the output is increased.

FIG. 11 is a graph showing the ripples of the ASE light from the wideband ASE light source. The ripples are periodic fluctuations (refer to B in the figure) of the output waveform with respect to the wavelength and caused by the amplification of a multi-path reflection interference phenomenon in the rare earth-doped optical fiber. The ripple amplitude as described above increases as the output of the pumping light source increases. The output of the wideband ASE light source becomes very unstable, and parasitic oscillation (refer to A in the figure) at a specific wavelength appears.

The Er-doped fiber used for the conventional wideband ASE light source has had a long length of, for example, 360 m and also unsuitable for compacting the device. The high power of the pumping light source and the long length of the Er-doped fiber have caused a drawback that the device has been expensive. The prior art has had the drawback that a compensating filter has been required for flattening the spectrum.

SUMMARY OF THE INVENTION

The present invention has an object to provide a wideband ASE light source whose output is stabilized by reducing ripples even with the high-output amplification and radiation of a wideband radiation light.

Another object of the present invention is to provide a wideband ASE light source whose spectrum flatness is improved by obtaining a high output covering the 1530-to-1610-nm band with a low pumping light intensity by means of an erbium-doped fiber.

The present invention provides a wideband ASE light source including a pumping light source that generates a pumping light, an erbium-doped optical fiber that generates an ASE light by incident pumping light, reflecting means that is arranged at one terminal portion of the erbium-doped optical fiber and reflects partially or totally the ASE light radiated from the erbium-doped optical fiber, an optical multiplexer that is arranged between a terminal portion of the erbium-doped optical fiber and the pumping light source and provided with a third terminal portion beside the terminal portion located on the erbium-doped optical fiber side and the terminal portion located on the pumping light source side and optically multiplexs and demultiplexs the pumping light with or from the ASE light; and an optical isolator that is arranged between the third terminal portion of the optical multiplexer and an output terminal and removes a return light to the erbium-doped optical fiber, the optical multiplexer having a maximum value of isolation in a wavelength band of 1570 nm to 1600 nm.

Moreover, according to the present invention, the ASE light source may include an ASE light source of which the optical multiplexer has isolation of 13 dB or more in this wavelength band of 1570 nm to 1600 nm.

Between the above-mentioned optical multiplexer and the pumping light source, another optical multiplexer having a maximum value of isolation in a wavelength band of 1570 nm to 1600 nm can be connected in series.

The multiplexer may include a fused-elongated portion formed of two optical fibers.

In the wideband ASE light source of the invention, the isolator may have a return loss not less than 60 dB reflective to the multiplexer.

Further, another isolator my be connected between the pumping light source and the optical multiplexer, wherein the another isolator also may have a return lose not less than 60 dB reflective to the multiplexer.

Furthermore, the present invention provides a wideband ASE light source including a pumping light source that generates a pumping light, an erbium-doped optical fiber that generates an ASE light by the pumping light incident on its one terminal portion, reflecting means that is arranged at the other terminal portion of the erbium-doped optical fiber and reflects partially or totally the ASE light, an optical multiplexer that has a first terminal portion connected to the one terminal portion of the erbium-doped optical fiber and a second terminal portion connected to the pumping light source, the optical multiplexer having a third terminal portion and multiplexing or demultiplexing the pumping light with or from the ASE light, and an optical isolator that is arranged between the third terminal portion of the optical multiplexer and an output terminal and removes a return light to the erbium-doped optical fiber, the erbium-doped optical fiber containing erbium at a concentration within a range of 1000 to 30000 ppm by weight. Furthermore, the erbium-doped optical fiber has a length in which an ASE light that is generated on one terminal side and has a first optical wavelength band is converted into a second optical wavelength band when the ASE light propagates to the other terminal.

For the wideband ASE light source of the present invention, it is preferable to connect the pumping light source and the reflector to the other terminal of the erbium-doped optical fiber.

BRIEF DESCRIPTION OF THE DRAWINGS

The present invention will be described below in further detail in reference to the accompanying drawings, in which:

FIGS. 7A and 7B are graphs of spectra of a relation between an ASE output from a wideband ASE light source of the present invention and the wavelength using the length of an Er-doped fiber EDF as a parameter;

FIGS. 8A and 8B show ASE spectra related to a preferred embodiment of the present invention;

EMBODIMENTS OF THE INVENTION

Embodiment 1

Figure 1:
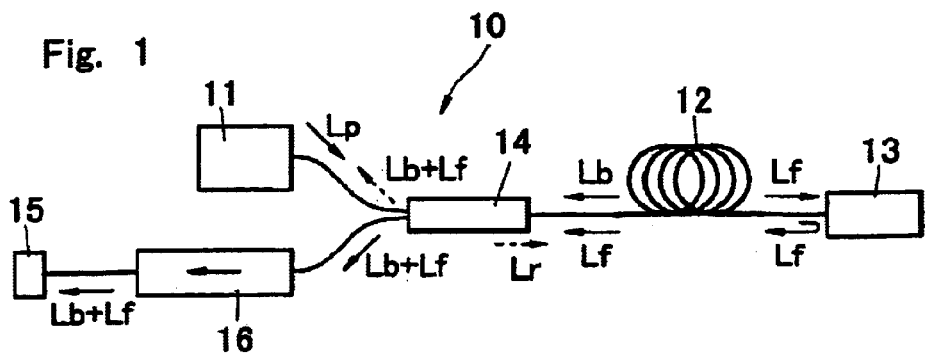
FIG. 1 shows the construction of a wideband ASE light source related to a preferred embodiment of the present invention.

FIG. 1 shows a preferred embodiment of a wideband ASE light source 10 of the present invention. A pumping light Lp emitted from a pumping light source 11 is transmitted through an optical multiplexer 14 and made incident on one terminal portion of an erbium-doped optical fiber 12. The erbium-doped optical fiber 12 on which the pumping light Lp is incident generates a backward light Lb and a forward light Lf of the ASE light.

The backward light Lb of the ASE light travels to the one terminal portion of the erbium-doped optical fiber 12, while the forward light Lf of the ASE light travels to the other terminal portion of the erbium-doped optical fiber 12. The forward light Lf of the ASE light is reflected on a reflector 13, made incident again on the erbium-doped optical fiber 12 and transmitted through the optical multiplexer 14 together with the backward light Lb of the ASE light. The optical multiplexer 14 has a function to multiplex or demultiplex the light of the wavelength of the pumping light Lp with or from the light of the wavelength of the backward light Lb and forward light Lf of the ASE light. The backward light Lb and forward light Lf of the ASE light, which has been transmitted through the optical multiplexer 14, is demultiplexed in the direction of an output terminal 15 provided with an optical isolator 16.

The optical isolator 16 is arranged in the forward direction with respect to the incident light of backward light Lb and forward light Lf and has a function to remove unnecessary reflection to the erbium-doped optical fiber 12 and functions to suppress parasitic oscillation accompanying an optical gain and increase the output of the ASE light. The backward light Lb and forward light Lf of the ASE light incident on the optical isolator 16 is transmitted through the optical isolator 16 and outputted from the output terminal 15.

The pumping light source 11 generates a pumping light Lp, which has a wavelength in, for example, a 1480 nm band or a 980 nm band.

The erbium-doped optical fiber 12 includes an optical fiber whose core portion is doped with erbium, which is an erbium element. The erbium-doped fiber radiates an ASE light in a 1550 nm band. For this purpose, the pumping light source 11 radiates a pumping light of a shorter wavelength to the inside of the erbium-doped optical fiber.

In contrast to this, the pumping light from the pumping light source utilizes light that has a wavelength in, for example, a 1480 nm band or a 980 nm band.

Erbium ions in the erbium-doped optical fiber 12 are excited by the pumping light Lp and generate an ASE light. However, the ASE light is a composite of lights that are generated inside the fiber and travel in random directions, and only the mode, which can propagate inside the core, propagates through the Er doped optical fiber 12. The principal propagation components are the backward light Lb that propagates backward and the forward light Lf that propagates forward.

The forward light Lf of the ASE light, which is the forward propagation light in the 1550 nm band, is reabsorbed in the latter half part inside the path of the Er-doped fiber 12, and this causes induced emission in the 1580 nm band. The forward light Lf, which is the forward propagation light, is further reflected on the reflector 13 and propagates in the backward direction through the Er-doped fiber 12. By this reflection, the probability of the reabsorption of the ASE light is increased, and the amplification of light in the 1580 nm band is performed with high pumping efficiency. Moreover, since the amount of reabsorption of the backward light Lb of the ASE light, which is the backward propagation light, is small, the greater part of the light propagates toward the optical multiplexer 14 in the form of light in the 1550 nm band.

For the optical multiplexer 14, a fused extension type optical multiplexer can be utilized. The optical multiplexer of this type is obtained by fusing and extending juxtaposed two optical fibers, the mode coupling of the extended portion of which separates light at a specified wavelength of incident light from the optical fiber and combines other lights at specified wavelengths. There can be utilized an optical multiplexer of a spatial coupling type, which unites a lens with a dielectric multilayer film in a space, separates a specific wavelength component of the incident light in the dielectric multilayer film and combines other specific wavelength components.

The reflector 13 has at least a function to reflect partially or totally the forward light Lf of the ASE light, and, for example, a reflecting mirror constructed of a dielectric multilayer film, an optical fiber grating, a fiber loop mirror, Fresnel reflection from an end surface of an optical fiber or the like can be used.

For the optical isolator 16, an in-line type optical isolator, which does not depend on a polarized wave, is used. The optical isolator should preferably be a two-stage type L-band optical isolator whose isolation in the 1580 nm band is 50 dB or more. In general, the optical isolator 16 is an optical module in which a lens, a birefringent crystal and a magneto-optic crystal are arranged in space.

A light Lr, which belongs to part of the ASE light of forward light Lf and backward light Lb from the erbium-doped optical fiber, reflects on the isolator and the multiplexer and returns to the erbium-doped optical fiber 12, causes ripples in the spectral distribution of the output intensity of the ASE light of forward light Lf and backward light Lb with respect to the spectrum. The reflected return light Lr to the erbium-doped optical fiber is amplified as a small signal in the erbium-doped optical fiber 12 and outputted together with the ASE light of light forward light Lf and backward light Lb. In this case, the reflected return light Lr itself has ripples. If the quantity of the reflected return light has a magnitude that cannot be ignored, then the ripples are amplified by the erbium-doped optical fiber 12 and observed as ASE light ripples.

Figure 2:
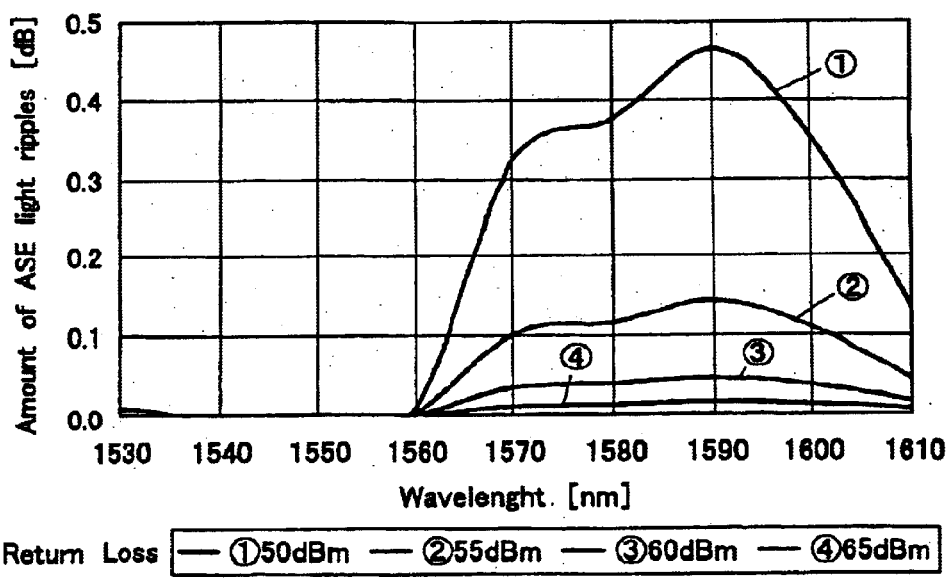
FIG. 2 shows a graph of a relation between the ripple quantity and the return loss of an ASE light obtained through calculation.

FIG. 2 is a graph of a relation between the ASE light ripple quantity and a return loss obtained through calculation. In this case, the return loss Rr indicates the ratio of the intensity $I_{Lr}$ of reflected return light Lr with respect to the sum ASE light intensity $I_{Lf}+I_{Lb}$ of forward light Lf and backward light Lb, and is expressed in dBm unit by the expression (1):

$$Rr = -10 \times \log(I_{Lr}/(I_{Lf}+I_{Lb})) \tag{1}$$

The horizontal axis represented the wavelength and the vertical axis represented the ASE light ripple quantity in FIG. 2, where the calculations were carried out when the return loss Rr was set at 50 dB, 55 dB, 60 dB and 65 dB. The calculations are based on the assumption that the reflected light from the optical multiplexer 14 or the pumping light source 11 returns again to the erbium-doped optical fiber 12 and amplified to become ASE light ripples.

In general, the amplification of the erbium-doped optical fiber 12 has a wavelength dependency. Particularly, in tile case of the wideband ASE light source of the reflective type double-path structure described in the present invention, the amplification of light at and around 1590 nm in the erbium-doped optical fiber is increased. Therefore, as shown in FIG. 2, the intensity of the ASE light changes more largely at the wavelength of 1570 nm to 1600 nm than in the other wavelength bands. It can be understood that the return loss in this wavelength band significantly influences the ASE light ripple quantity.

The reflected return light Lr to the erbium-doped optical fiber 12 includes a return light from the pumping light source 11. The ASE light of backward light Lb and forward light Lf generated in the erbium-doped optical fiber 12 is regularly demultiplexed in the direction of the optical isolator 16 by the optical multiplexer 14 and outputted from the output terminal 15. However, the optical multiplexer 14 does not completely perform the demultiplexing in the direction of the optical isolator 16, and there may exist the backward light Lb and forward light Lf of the ASE light that travels toward the pumping light source 11. The quantity of this light that travels toward the pumping light source 11 is determined depending on the performance of the isolation of the optical multiplexer 14. Further, the ASE light, which travels toward the pumping light source 11, is reflected on the pumping light source 11, transmitted again through the optical multiplexer 14 and returned to the erbium-doped optical fiber 12 to become the reflected return light Lr. In this case, the quantity of light transmitted through the optical multiplexer 14 is also determined depending on the isolation performance of the optical multiplexer 14.

Figure 3:
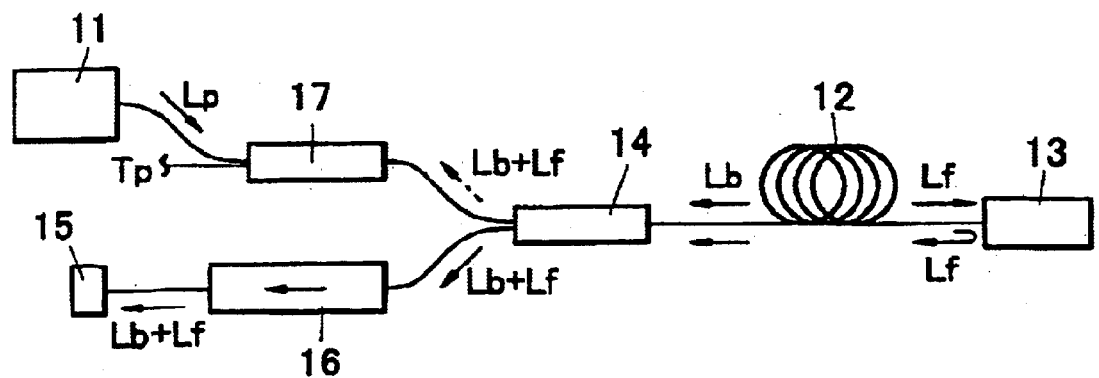
FIG. 3 shows a wideband ASE light source related to another preferred embodiment of the present invention.

FIG. 3 shows the construction of the optical multiplexer 14, in which a fiber port 1 is arranged on the pumping light source 11 side, a fiber port 2 is arranged on the erbium-doped optical fiber 12 side, and a fiber port 3 is arranged on the optical isolator 16 side.

The isolation Iw of the optical multiplexer 14 is defined by the rate of an incident light, which comes from the fiber port 2 located on the erbium-doped optical fiber 12 side and is transmitted through the fiber port 1 located on the pumping light source 11 side and expressed in dBm by the expression (2)

$$Iw=-10\times\log(I_{Lout}/I_{Lin}) \quad (2).$$

Lin indicates the quantity of light at a specific wavelength incident on the fiber port 2, and Lout indicates the quantity of light that belongs to the incident light and has been transmitted through the fiber port 1. The incident light quantity Lin and the transmitted light quantity Lout can be obtained by being measured by an optical power meter or the like.

As described above, the reflected return light Lr to the erbium-doped optical fiber 12 from the pumping light source 11 is transmitted two times through the optical multiplexer 14, and therefore, the return loss Rr can be expressed with the isolation Iw by the expression (3):

$$Rr=Rp+2\times Iw \quad (3).$$

where Rp represents the return loss of the pumping light source 11.

In general, the isolation Iw of the optical multiplexer 14 has a wavelength characteristic. By setting a maximum value in the wavelength band of 1570 nm to 1600 nm, the return loss Rr becomes greater in the wavelength band of 1570 nm to 1600 nm than in the other wavelength bands according to the expression (3). Consequently, as shown in FIG. 2, the quantity of ASE light ripples can effectively be reduced because the return loss Rr is large in the wavelength band of 1570 nm to 1600 nm.

With regard to the wavelength characteristic of the isolation Iw of the optical multiplexer 14, the fused extension type optical multiplexer separates and combines the specific wavelengths by mode coupling in the fused extension portion as described hereinbefore. The wavelengths to be separated and combined can easily be controlled by adjusting the length of the fused extension portion, and this allows the isolation to be maximized and allows the insertion loss to be minimized at the wavelength of 1570 nm to 1600 nm. Moreover, in the case of the spatial coupling type optical multiplexer, the specific wavelengths are separated and combined by the dielectric multilayer film. By selecting a dielectric multilayer film for efficiently carrying out the separation and combining at the wavelength of 1570 nm to 1600 nm, the isolation can be maximized and the insertion loss can be minimized at the wavelength of 1570 nm to 1600 nm.

As described above, by adopting the double-path structure for reflecting the ASE light of forward light Lf by the reflector 13, light of a higher intensity can be outputted. Moreover, the backward light Lb of the ASE light is the light in the short wavelength band of 1.53 to 1570 nm, while the forward light Lf of the ASE light is the light in the long wavelength band of not shorter than 1570 nm. Therefore, by reflecting the forward light Lf of the ASE light and outputting the light together with the backward light Lb, a light source of a very wide band can be achieved. Furthermore, because the isolation Iw of the optical multiplexer 14 has the maximum value in the wavelength band of 1570 nm to 1600 nm, a wideband ASE light source of a small quantity of ASE light ripples can be achieved.

FIG. 2 shows a relation between the ASE light source ripple quantity and the return loss Rr. In general, the ASE light source is used as a light source for measuring the wavelength characteristic of the insertion loss of an object to be measured in combination with an optical spectrum analyzer for measuring the wavelength and power of light. The object to be measured is, for example a passive device such as an optical fiber coupler or a demultiplexer, and these devices have an insertion loss of about 0.3 dB or more. Therefore, for the accuracy of measurement, the ASE light ripple quantity should preferably be 0.05 dB or less. Therefore, according to the calculation results shown in FIG. 2, it was discovered that about 60 dB or more of the return loss Rr was required at least within the wavelength range of 1570 nm to 1600 nm for the achievement of the ASE light ripple quantity of 0.05 dB or less.

In order to achieve this, from the expression (3) can be derived the expression (4):

$$Rr=Rp+2\times Iw \geq 60 \; dB \quad (4)$$

where Iw represents the isolation of the optical multiplexer 14, and Rp represents the return loss of the pumping light source 11.

It is clear that since the reflective return loss or the pumping light source 11 has been determined to be in a range of 34 to 40 dB, the return loss of light reflective from a pumping light source 11 to the erbium-doped fiber 12 can be achieved to more than 60 dB if the isolation Rp of the light multiplexer 14 is not less than 13 dB, and that the return loss of the multiplexer 14 reflective toward the erbium-doped fiber 12 is required to be no more than 60 dB. By adopting the double-path structure for reflecting the forward light Lf of the ASE light by the reflector 13, light of higher intensity can be outputted. Moreover, the backward light Lb of the ASE light is the light in the short wavelength band of 1530 nm to 1570 nm, while the forward light Lf of the ASE light has a longer wavelength band than 1570 nm. Therefore, by reflecting the forward light Lf of the ASE light and outputting the light together with the backward light Lb, a light source of a very wide band can be achieved. Furthermore, by setting the isolation Iw of the optical multiplexer 14 to 13 dB or more in the wavelength band of 1570 nm to 1600 nm, there is achieved a wideband ASE light source of a stable output of which the ASE light ripple quantity is 0.05 dB or less.

FIRST EXAMPLE

The ASE light source shown in FIG. 1 was produced as an implemental example of the wideband ASE light source of the present invention. The pumping light source 11 can radiate a pumping light of an optical output of about 100 mW in the 1480 nm band. The return loss on the output side of the pumping light source 11 was about 36 dB. The optical multiplexer 14 is a fiber-fused extension type and has a function to multiplex light in the 1480 nm band with light in the 1580 nm band. The isolation of the optical multiplexer 14 was 13 dB or more at the wavelength of 1570 nm to 1600 nm. The used erbium-doped optical fiber 12 had a long length sufficient for the reabsorption of light in the 1550 nm band, and the length was set at about 80 m in this implemental example.

The reflector 13 was constructed of a dielectric multilayer film and an optical fiber, and the reflectance was 90% or more. Before the output terminal 15 is arranged a two-stage optical isolator of the type that does not depend on the polarized wave. The isolation was 55 dB or more in the 1580 nm band, and the return loss on the incident side was 62 dB. The output terminal 15 is constructed of an FC/SPC connector and has a return loss of 45 dB or more.

Figure 6:
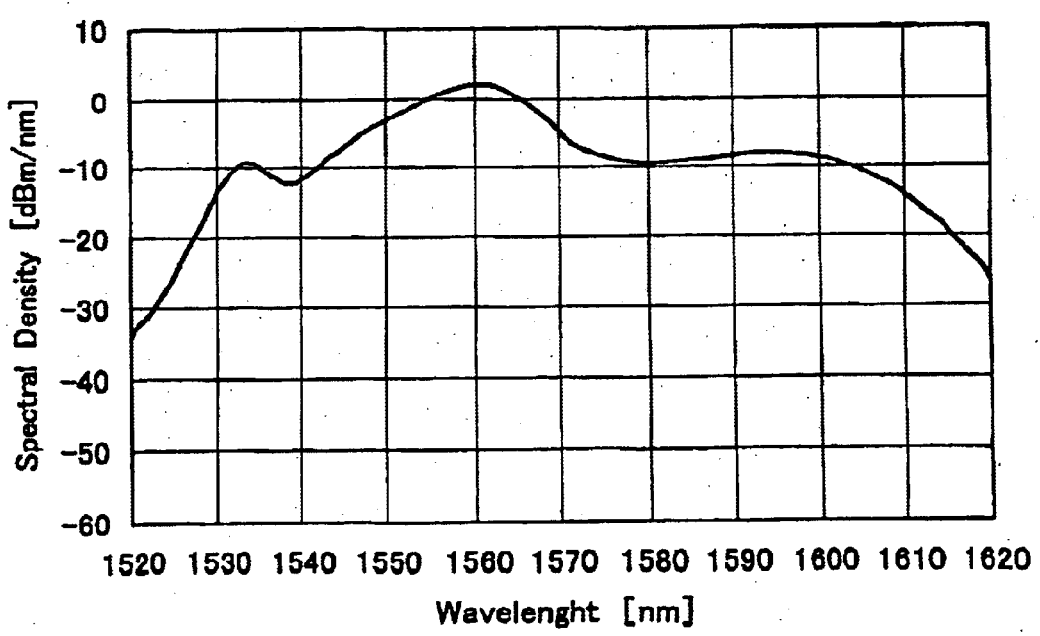
FIG. 6 is a graph showing the spectrum output of a wideband ASE light source of the present invention.

FIG. 6 shows the spectrum output of the prototype wideband ASE light source of the present invention. This light source achieved a total ASE light output of +15 dBm, a ripple quantity of 0.03 dB at maximum (at 1590 nm) and a wideband spectral density of −15 dBm/nm or more within the range of 1530 to 1610 nm.

The conventional optical multiplexer has a maximum value in the wavelength band of 1530 nm to 1560 nm and isolation of 10 dB or less at the wavelength band of 1570 nm to 1600 nm. The ASE light source, which employed this optical isolator, had a total output of +15 dBm, a ripple quantity of about 0.2 to 0.3 dB and a spectral density of −15 dBm/nm or more within the range of 1530 to 1610 nm. According to the above-mentioned implemental example, an ASE light source of a small ripple rate was able to be achieved over a wide band with an output higher than that of the conventional ASE light source.

Although the pumping light source in the 1480 nm band was employed in the implemental example, it was confirmed that a similar effect was produced also with a pumping light source in the 980 nm band.

Embodiment 2

Figure 4:
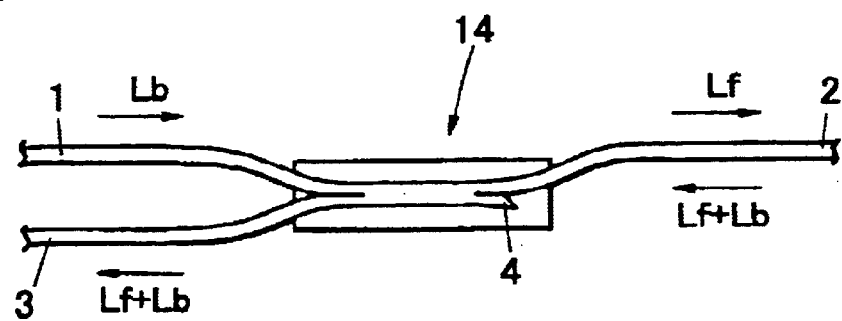
FIG. 4 shows an optical multiplexer used for a wideband ASE light source related to a preferred embodiment of the present invention.

FIG. 4 shows another preferred embodiment of the present invention. This preferred embodiment constitutes a double path for reflecting the forward light Lf of the ASE light by the reflector 13 similarly to the aforementioned preferred embodiment.

In this preferred embodiment, another optical multiplexer 17 is arranged between the optical multiplexer 14 and the pumping light source 11. A terminal portion Tp of the optical multiplexer 17 corresponded to the terminal portion located on the optical isolator 16 side of the optical multiplexer 14, and this terminal served as a free terminal. In this case, the terminal portion Tp has one reflection point and is not specifically prescribed with regard to the return loss since no ASE light ripple occurs. The terminal end surface should preferably be diagonally cut or undergo retractive index matching and processed to prevent the occurrence of reflection.

With regard to the optical multiplexer 17, as described in connection with the first preferred embodiment, the ASE light of backward light Lb and forward light Lf generated in the erbium-doped optical fiber 12 is demultiplexed in the direction of the optical isolator 16 by the optical multiplexer 14 and outputted from the output terminal 1b. On the other hand, the ASE light of backward light Lb and forward light Lf of the quantity determined by the isolation characteristic of the optical multiplexer 14 travels toward the optical multiplexer 17. The backward light Lb and forward light Lf of the ASE light, which has traveled to the optical multiplexer 17, is terminated at the fiber terminal portion Tp. Also, in this place, light of a quantity determined by the isolation characteristic of the optical multiplexer 17 travels toward the pumping light source 11. Further, the light is reflected on the pumping light source 11, transmitted through the optical multiplexers 17 and 14 and returned to the erbium-doped optical fiber 12. In this case, the quantity of light transmitted through each of the optical multiplexers 14 and 17 is determined by the isolation characteristic of each of the multiplexers.

In this case, when the optical multiplexer 14 is a fused extension type optical multiplexer, the isolation Iw is generally 10 dB or more in the wavelength band of 1570 nm to 1.6 μm. For example, if the isolation of the optical multiplexer 14 is 10 dB and the return loss of the pumping light source 11 is 34 dB in the absence of the optical multiplexer 17, then the return loss Rr from the pumping light source 11 to the erbium-doped optical fiber 12 becomes 34 dB+2×10 dB=54 dB according to the expression (3), and the ASE light ripple quantity undesirably becomes 0.15 dB or more according to FIG. 2.

Accordingly, in this preferred embodiment, by arranging the optical multiplexer 17 and interrupting the reflected return light by the isolation of the optical multiplexer 14 and the optical multiplexer 17, a construction that is not influenced by the reflection on the pumping light source 11 was provided. For example, if the isolation of the optical multiplexer 14 is 10 dB, the isolation of the optical multiplexer 17 is 10 dB and the return loss of the pumping light source 11 is 34 dB, then the reflected return light to the erbium-doped optical fiber 12 becomes 34 dB+2×10 dB+2×10 dB=74 dB. This sufficiently satisfies the return loss condition of 60 dB or more, with which the ASE light ripple quantity becomes 0.05 dB or less.

As described above, the present preferred embodiment is characterized in that the optical multiplexer 17 is arranged between the pumping light source 11 and the optical multiplexer 14, meaning that a plurality of optical multiplexers 14 and 17 are provided. As described above, by making the isolation of the plurality of optical multiplexers 14 and 17 have the maximum value or 13 dB or more in the wavelength hand of 1.57 to 1600 nm, the ASE light ripple quantity is further reduced to allow a stable wideband ASE light source to be obtained. Moreover, combining the plurality of optical multiplexers 14 and 17 with each other as described above obviates the need for increasing the isolation Iw of the individual optical multiplexers 14 and 17 and allows the manufacturing to be easy.

Figure 5:
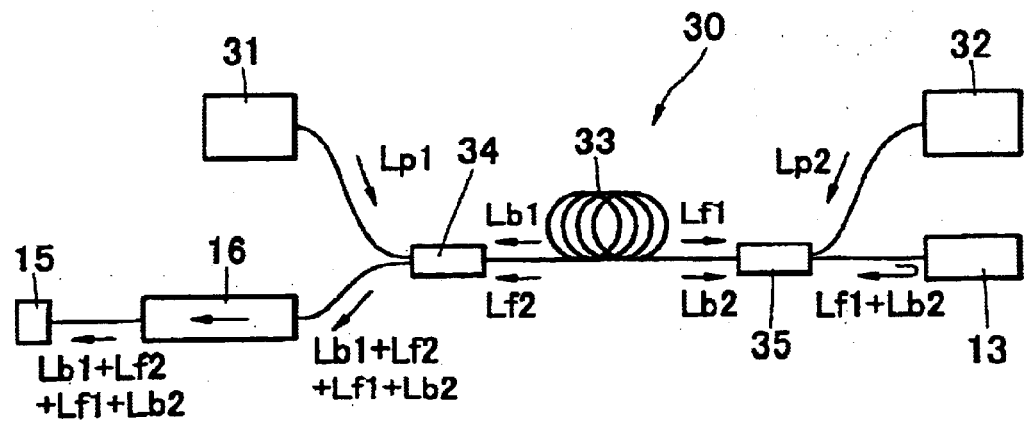
FIG. 5 shows a wideband ASE light source related to another preferred embodiment of the present invention.

FIG. 5 is a schematic view showing another preferred embodiment of the present invention.

Embodiment 3

Optical multiplexers 34 and 35 and pumping light sources 111 and 32 are arranged at both terminals of an erbium-doped optical fiber 33, providing a construction in which pumping is caused bidirectionally in the erbium-doped optical fiber 33. By thus combining the reflection double-path structure with the bidirectional pumping construction, an ASE light source of a higher output and a wider band is achieved.

This preferred embodiment also has the effect of reducing the ASE light ripple quantity because the maximum value of isolation resides in the wavelength band of 1570 nm to 1600 nm in the optical multiplexers 34 and 35. Moreover, by arranging optical multiplexers between the pumping light sources 111 and 32 and the optical multiplexers 34 and 35 similarly to the second preferred embodiment, there is a further effect of reducing the ASE light ripple quantity.

Although the two pumping light sources are employed for the method of causing the bidirectional pumping in the present preferred embodiment, it is possible to cause the bidirectional pumping by branching the pumping light from one pumping light source by means of an optical branching device.

According to the wideband ASE light source described above in the present preferred embodiment, there can be achieved a wideband ASE light source that has a high output, a wide band, weak possibility of the occurrence of oscillation and ripples of 0.05 dB or less.

Embodiment 4

As described hereinabove in connection with the first preferred embodiment, in the ASE light source of FIG. 1, for example, the pumping light source 11, which is a semiconductor laser, is connected to one terminal of the Er-doped optical fiber 12 that serves as an erbium-doped optical fiber via the multiplexer 14, and the reflector 6 is connected to the other terminal of the Er-doped fiber 12. The optical isolator 16 is connected to one terminal of the optical multiplexer 14, and the ASE light is outputted from the output terminal 1 through the optical isolator 16. If the reflected light from the output terminal 1 returns to the Er-doped fiber 12, then the ASE light becomes unstable. However, by restricting the reflected light from the output terminal 1 side from returning to the inside of the Er-doped fiber 12 by the optical isolator 16, the ASE light is prevented from becoming unstable.

The pumping light outputted from the pumping light source 11 has the wavelength thereof residing in the 1480-nm band or the 980-nm band and is guided to the Er-doped fiber 12 via the optical multiplexer 14. Upon receiving incident light from the pumping light source 11, the ASE light in the 1550-nm band (first wavelength band) is first emitted in the fore part on one terminal side of the Er-doped fiber 12 to which the optical multiplexer 14 is connected, and the ASE light propagates to both sides of the Er-doped fiber 12. The ASE light, which has propagated to the optical isolator 16 side, is the light in the 1550-nm band and outputted from the output terminal 1 by passing through the optical isolator 16. Further, the ASE light in the 1550-nm band (first wavelength band) propagating to the reflector 6 side becomes an ASE light in the 1580-nm band (second wavelength band) when propagating to the other terminal by being absorbed in the hind part of the Er-doped fiber 12 on the way. The ASE light in the 1580-nm band is further reflected on the reflector 6 and returned to the Er-doped fiber 12 so as to be amplified inside the Er-doped optical fiber 12 and outputted from the output terminal 1. In this state, the ASE light in the 1550-nm band and the ASE light in the 1580-nm band are outputted from the output terminal 1 while being mixed with each other.

In this preferred embodiment, the erbium concentration in the Er-doped fiber is increased, and the length of the Er-doped fiber employed as an optical amplifier can be reduced. This enables the optical amplifier and the ASE light source to be compacted.

However, when the erbium concentration is increased too much, the ASE output is reduced by an interaction between erbium ions in the excited state. In the case of a quartz-based optical fiber, this phenomenon (referred to as concentration quenching) occurs when the erbium concentration of the Er-doped fiber exceeds 100 ppm. However, a fiber, which has an erbium concentration of about 1000 ppm by adding aluminum (Al) together, does not cause the concentration quenching. For example, in quartz glass for optical fiber, the Er concentration limits in a range of 1000 to 1200 ppm are preferred to avoid the concentration quenching and shorten the fiber lengths. Also, in bismuth-contained glasses, the upper concentration of Er in the glass may be 5000 ppm for the reason of concentration quenching.

Moreover, the intensity of the pumping light in the erbium-doped core portion is increased by making the fiber have a high NA structure. A region of low intensity of the pumping light does not overlap the core portion, and therefore, high efficiency can be achieved.

Conventionally, the erbium doping concentration of the Er-doped fiber has been about 200 ppm to 400 ppm. Therefore, the Er-doped fiber has been required to have a length of 10 m to 20 m when producing a 1550-nm-band ASE light source and required to have a length or about 50 m to 100 m when constituting a 1580-nm-band ASE light source. In the present invention, by setting the erbium doping concentration of the Er-doped fiber 12 to 1000 ppm or more, the length of the Er-doped fiber can be made equal to or shorter than 10 to 20 m in the ASE light source that covers the 1580-nm band, similarly to the 1550-nm band.

By further increasing the erbium concentration, the length of the fiber 12 can further be shortened to allow the ASE light source to be compacted. For example, the use of the Er-doped fiber of an erbium doping concentration of, for example, 5000 ppm enables the Er-doped fiber to have a length of 2 m to 4 m.

It is defined that the Er-doped fiber 12 of the present invention has a length in which an ASE light in the 1550-nm band (first wavelength band) generated at one terminal is converted into the 1580-nm band (second wavelength band) when the ASE light propagates to the other terminal. Whether or not the practically used Er-doped fiber 12 has the above-mentioned length can be confirmed by inputting the light in the first wavelength band to this Er-doped fiber 12.

FIGS. 7A and 7B explain the length of the erbium-doped fiber (EDF) of the ASE light, converted from the first wavelength band into the second wavelength band. FIG. 7A shows simulations of an ASE light spectrum waveform outputted from the other terminal of the Er-doped fiber when a 1480-nm band pumping light is inputted from one terminal of the Er-doped fiber. For the Er-doped fiber, a quartz-based optical fiber, which is obtained by doping quartz with erbium that is the rare earth element and has an amplifying action of a signal light, is used. If the Er-doped fiber length is changed from 20 m to 150 m with a pumping light intensity of 100 mW, then the ASE light source has the first wavelength band of 1530 nm to 1560 nm when the Er-doped fiber length is 20 m to 30 m. However, when the Er-doped fiber length is made to be 100 m, the ASE output at the wavelength of 1540 nm is reduced by 30 dB or more and makes a transition to the second wavelength band of the 1565-nm-to-1610-nm band (1580-nm band).

In the fore part of the fiber, Er causes the 1550-nm band ASE due to pumping in the 1480-nm band or the 980-nm band. The hind part of the fiber absorbs the ASE light in this 1550-nm band, and 1580-nm band amplification occurs. If the fiber is elongated, then the principal output light of the ASE light makes a transition from the 1550-nm band to the 1580-nm band, and this length is referred to as a length to be converted.

FIG. 7B shows simulations of an ASE light spectrum outputted from the one terminal of the Er-doped fiber when a 1480-nm band pumping light is inputted from one terminal of the Er-doped fiber. Even it the Er-doped fiber length is varied from 20 m to 150 m with a pumping light intensity of 100 mW, the ASE light output in the 1530-to-1565-nm band remains as it is, and no transition to the 1580-nm band is observed.

According to the above-mentioned phenomena, by adopting the construction of the present invention in which an Er-doped fiber of a high erbium concentration doped together with aluminum is selected and the length of the Er-doped fiber is optimized, a high-output, compact and inexpensive wideband ASE light source can be achieved.

Embodiment 5

As described in connection with the aforementioned third preferred embodiment, FIG. 5 shows a wideband ASE light source, in which a second pumping light source 32 is connected to an Er-doped fiber terminal 33 located on the reflector 13 side via an optical multiplexer 35. In thin case, by increasing the Er doping concentration to a concentration of 1000 ppm or more in this Er-doped fiber 33, the length of the Er-doped fiber 33 can effectively be reduced.

The pumping light source 32 radiates laser light whose wavelength resides in the 1480-nm band or the 980-nm band. In order to obtain a high-output ASE light, the optical intensities of the first pumping light source 31 and the second pumping light source 32 should preferably be as high as possible. However, in order to flatten the spectral density, the light intensity of the one terminal side pumping light source 31 of the Er-doped fiber 33 should preferably be higher than that of the pumping light source 32 located on the other terminal portion side. This is because the second pumping light source 32 principally contributes to the amplification in the 1580-nm band ASE light reflected on the reflector 13. That is, the 1580-nm band ASE light is efficiently amplified in the presence of the reflector 13.

By properly selecting the light intensity ratio of the second pumping light source 32 with respect to the first pumping light source 31, the ASE spectral density can be flattened.

SECOND EXAMPLE

The ASE light source shown in FIG. 1 was produced as a fourth implemental example of the wideband ASE light source of the present invention.

FIGS. 8A and 8B show the experiment results of the ASE light source of the preferred embodiment shown in FIG. 1. The pumping light source 31 had a wavelength of 1480 nm, and the pumping output was set to 110 mW in FIG. 8A and set to 130 mW in FIG. 8B. For the Er-doped fiber 12, a quartz-based erbium-doped optical fiber availed on the market was employed. The Er-doped fiber had an erbium concentration of 1200 ppm, and the Er-doped fiber length was set within a range of 13.5 to 18 m. The reflectance of the reflector was 90%.

The operating wavelength band of this implemental example is almost the same as that of the prior art. If the pumping intensity is increased (From 110 mW to 130 mW), then the output on the longer wavelength side (1570 to 1610 nm) increases and, at the same time, the ASE light intensity also increases. If the Er-doped fiber length is short, then the ASE output on the shorter wavelength side is reduced. If the Er-doped fiber length is elongated, then the ASE output on the longer wavelength side is reduced. Therefore, the optimum Er-doped fiber length is about 13.5 m when the pumping light intensity is 110 mW and about 15 m when the pumping light intensity is 130 mW.

The ASE output light spectral density is −20 dBm (1530 to 1610 nm) and −12 dBm (1550 to 1600 nm) according to the prior art. In the implemental example of the present invention, as shown in FIG. 8B, there is a high output of −12 dBm (1530 to 1610 nm) and −7 dBm (1550 to 1600 nm). Furthermore, the pumping light intensity can be suppressed to 130 mW/204 mW (≈54%) with respect to that of the prior art. The Er-doped fiber length can be improved to 15 m/360 m (≈4%) with respect to that of the prior art, and the spectrum flatness (difference between the maximum output value and the minimum output value of spectrum) in the 1530-to-1600-nm wavelength band becomes 15 dB or less.

With this arrangement, the use of the reflector 13 and the use of the high-erbium-concentration Er-doped fiber enable the provision of a high-output wideband ASE light source, which is compact by virtue of a short Er-doped fiber and is inexpensive by virtue of the short Er-doped fiber length.

THIRD EXAMPLE

Figure 9:
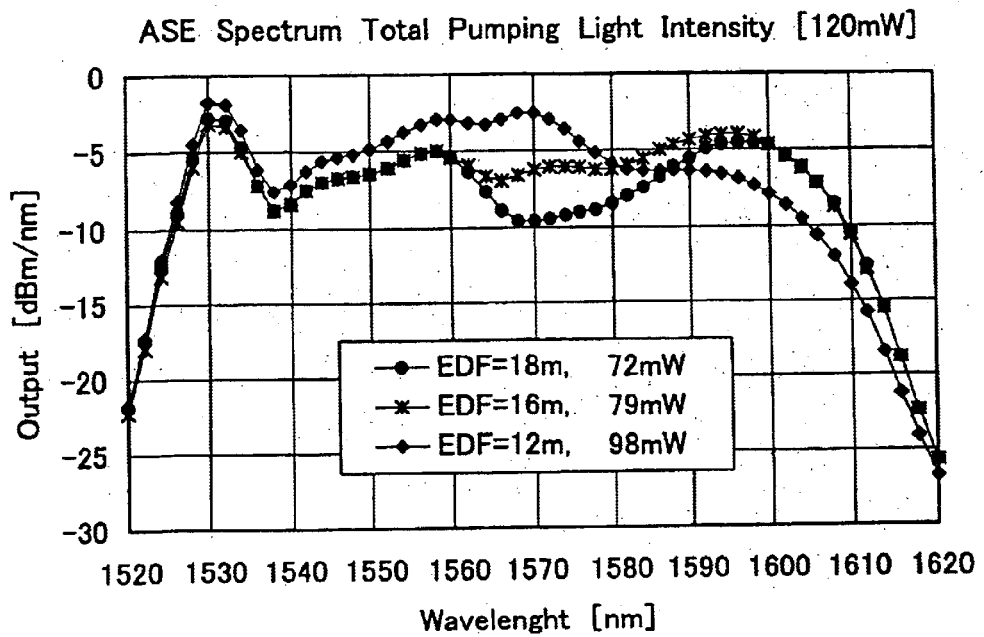
FIG. 9 shows the spectrum of an ASE output from a wideband ASE light source of a preferred embodiment of the present invention.
Figure 10:
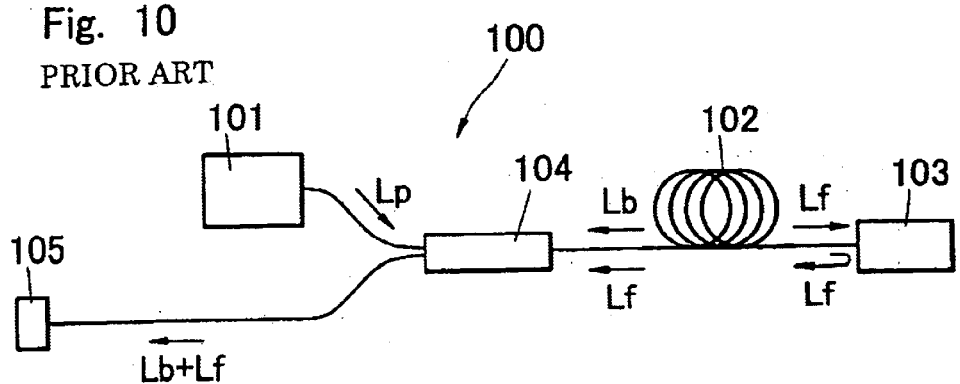
FIG. 10 is a view showing the construction of a conventional wideband ASE light source.
Figure 11:
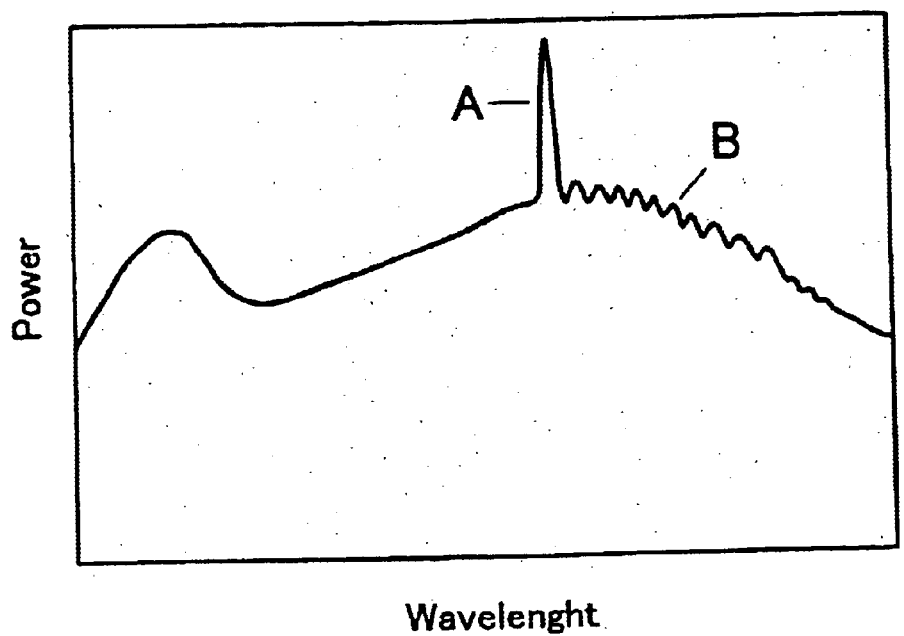
FIG. 11 is a graph showing ASE light ripples of a wideband ASE light source.

As an implemental example of the wideband ASE light source of the present invention, an experiment of the ASE light source (shown in FIG. 3) described in connection with the aforementioned fifth preferred embodiment was carried out. FIG. 9 shows the ASE-based light spectra of the experiment results with the ASE light source of this implemental example.

The first pumping light source 31 and the second pumping light source 32 supply light at a wavelength of 980 nm. A total power of the pumping outputs of the pumping light source 31 and the pumping light source 32 was set to 120 mW, and the other factors were set similarly to the aforementioned implemental examples.

The Er-doped fiber length and the pumping light intensity ratio were optimally adjusted so that the ASE spectral density became flat in the above-mentioned state. When the fiber length was varied from 12 m to 18 m, the optical intensities of the pumping light source 32 and the pumping light source 11 were 48 mW and 720 mW, respectively, when the fiber had a length of 18 m. It was discovered that tho light intensity of the pumping light source 11 should preferably be higher when the fiber length was shortened, and the ASE output was also increased.

For example, when the Er-doped fiber length was 16 m, the ASE output intensity was 14.4 dBm with the pumping light source 32 set at 41 mW and with the pumping light source 11 set at 79 mW. At this time, the spectral density is −10 dBm/nm (1528 to 1610 nm) and the spectrum flatness is 7 dB, exhibiting considerable improvements in comparison with those of the prior art.

According to the above facts, the spectrum flatness can be improved in this system. It was confirmed that the light intensity of the pumping light source 11 was higher than that of the pumping light source 32 at this time.

As described above, the present invention specifies that the erbium-doped optical fiber has an erbium concentration of 1000 ppm or more and has a length in which the ASE light that is generated on one terminal side and has the first optical wavelength band is converted into the second optical wavelength band when the ASE light propagates to the other terminal. With this arrangement, there can be obtained a high-output wideband ASE light, which has a low pumping power and an excellent spectrum flatness in the 1530-to-1600-nm wavelength band with the erbium-doped fiber, and this allows the achievement of compactness and a low price.

What is claimed is:

1. A wideband ASE light source comprising:

a pumping light source that generates a pumping light;

an erbium-doped optical fiber that generates an ASE light upon receiving the pumping light incident on its one terminal portion;

reflecting means that is arranged at the other terminal portion of the erbium-doped optical fiber and reflects partially or totally the ASE light radiated from the erbium-doped optical fiber;

an optical multiplexer provided with a first terminal portion connected to the one terminal portion of the erbium-doped optical fiber and a second terminal portion connected to the pumping light source, the optical multiplexer being provided with a third terminal portion and functioning to multiplex and demultiplex the pumping light with or from the ASE light; and an optical isolator that is arranged between, a third terminal portion of the optical multiplexer and an output terminal and removes a return Light to the erbium-doped optical fiber, the optical multiplexer having a maximum value of isolation in a wavelength band of 1570 nm to 1600 nm.

2. A wideband ASE light source comprising:

a pumping light source that generates a pumping light;

an erbium-doped optical fiber that generates an ASE light upon receiving the pumping light incident on its one terminal portion;

reflecting means that is arranged at the other terminal portion of the erbium-doped optical fiber and reflects partially or totally the ASE light radiated from the erbium-doped optical fiber;

an optical multiplexer provided with a first terminal portion connected to the one terminal portion of the erbium-doped optical fiber and a second terminal portion connected to the pumping light source, the optical multiplexer being provided with a third terminal portion and functioning to multiplex and demultiplex the pumping light with or from the ASE light; and an optical isolator that is arranged between a third terminal portion of the optical multiplexer and an output terminal and removes a return light to the erbium-doped optical fiber, wherein the isolation of the optical multiplexer is 13 dB or more in the wavelength band of 1570 nm to 1600 nm.

3. The wideband ASE light source according to claim 1 or 2, wherein between the optical multiplexer and the pumping light source is optically connected another optical multiplexer having a maximum value of isolation in a wavelength band of 1570 nm to 1600 nm.

4. The wideband ASE light source according to claim 1 or 2, wherein the multiplexer comprise a fused-elongated portion formed of two optical fibers.

5. The wideband ASE light source according to claim 1 or 2, wherein the isolator has a return loss not less than 60 dB reflective to the erbium-doped optical fiber.

6. The wideband ASE light source according to claim 1 or 2, wherein another isolator is connected between the pumping light source and the optical multiplexer.

7. A wideband ASE light source comprising:

a pumping light source that generates a pumping light;

an erbium-doped optical fiber that generates an ASE light upon receiving the pumping light incident on its one terminal portion, wherein aluminum is added to the optical fiber;

reflecting means that is arranged at the other terminal portion of the erbium-doped optical fiber and reflects partially or totally the ASE light;

an optical multiplexer provided with a first terminal portion connected to the one terminal portion of the erbium-doped optical fiber and a second terminal portion connected to the pumping light source, said optical multiplexer being provided with a third terminal portion and functioning to multiplex and demultiplex the pumping light with or from the ASE light; and an optical isolator that is arranged between the third terminal portion of the optical multiplexer and an output terminal and removes a return light to the erbium-doped optical fiber, the erbium-doped optical fiber containing erbium at a concentration within a range of 1000 to 30000 ppm and having a length in which an ASE light that is generated on one terminal side and has a first optical wavelength band is converted into a second optical wavelength, band when the ASE light propagates to the other terminal.

8. The wideband ABE light source according to claim 7, wherein another pumping light source is connected to the other terminal of the erbium-doped optical fiber via another optical multiplexer.

9. The wideband ASE light source according to claim 8, wherein the pumping light source located at the one terminal of the erbium-doped optical fiber has a light intensity higher than that of the pumping light source located at the other terminal.

* * * * *